US010739535B2

(12) United States Patent
Vallance et al.

(10) Patent No.: US 10,739,535 B2
(45) Date of Patent: Aug. 11, 2020

(54) PROCESS FOR RESHAPING AND RESIZING GROOVES IN OPTICAL FIBER FERRULES

(71) Applicant: NANOPRECISION PRODUCTS, INC., El Segundo, CA (US)

(72) Inventors: Robert Ryan Vallance, Newbury Park, CA (US); King-Fu Hii, Camarillo, CA (US); Yang Chen, Thousand Oaks, CA (US); Joseph Kim Bond, Newbury Park, CA (US); Po-Tsung Wu, Chino Hills, CA (US); Michael K. Barnoski, Pacific Palisades, CA (US); Matthew Gean, Camarillo, CA (US)

(73) Assignee: CUDOQUANTA FLORIDA, INC., Sarasota, FL (US)

( * ) Notice: Subject to any disclaimer, the term of this patent is extended or adjusted under 35 U.S.C. 154(b) by 425 days.

(21) Appl. No.: 15/697,443

(22) Filed: Sep. 6, 2017

(65) Prior Publication Data
US 2018/0088289 A1   Mar. 29, 2018

Related U.S. Application Data

(60) Provisional application No. 62/384,154, filed on Sep. 6, 2016, provisional application No. 62/384,141, filed
(Continued)

(51) Int. Cl.
*H01R 43/04* (2006.01)
*G02B 6/38* (2006.01)
(Continued)

(52) U.S. Cl.
CPC ......... *G02B 6/3898* (2013.01); *G02B 6/3838* (2013.01); *G02B 6/3843* (2013.01);
(Continued)

(58) Field of Classification Search
CPC ... H01L 23/481; G02B 6/4248; G02B 6/4243; G02B 6/3881; G02B 6/4245; G02B 6/3855; Y10T 29/49181
(Continued)

(56) References Cited

U.S. PATENT DOCUMENTS

| 4,458,985 | A | 7/1984 | Balliet et al. |
| 7,343,770 | B2 | 3/2008 | Barnoski et al. |
| 9,091,833 | B2 * | 7/2015 | Chen .................. G02B 6/4471 |

FOREIGN PATENT DOCUMENTS

WO    2012/139914    10/2012

OTHER PUBLICATIONS

International Search Report of Counterpart PCT International Application No. PCT/US2017/050365.

* cited by examiner

*Primary Examiner* — Thiem D Phan
(74) *Attorney, Agent, or Firm* — Liu & Liu

(57) ABSTRACT

A process and tool for reshaping and resizing grooves that were pre-formed in a pair of ferrules halves of an optical fiber ferrule. The pre-formed grooves are further subject to a separate, subsequent reshaping and resizing step using the tool and a gauge that may be a bare section of optical fiber or a pin. The ferrule halves are aligned, and using the pre-formed grooves as guides for the gauge optical fiber or gauge pin, the ferrule halves are compressed together with the gauge optical fiber or gauge pin therebetween, thereby reshaping and resizing the respective grooves on the ferrule halves. After reshaping and resizing, the resultant groove that is finally formed on each ferrule halve would be precisely shaped, sized and located with respect to the external alignment surface of each ferrule halve. The ferrule halves may be used to terminate an optical fiber cable.

10 Claims, 14 Drawing Sheets

Related U.S. Application Data on Sep. 6, 2016, provisional application No. 62/384,143, filed on Sep. 6, 2016, provisional application No. 62/384,146, filed on Sep. 6, 2016.

(51) Int. Cl.
  *G02B 6/44* (2006.01)
  *G02B 6/36* (2006.01)
  *H01R 43/01* (2006.01)

(52) U.S. Cl.
  CPC .......... *G02B 6/3874* (2013.01); *G02B 6/443* (2013.01); *G02B 6/4471* (2013.01); *G02B 6/3616* (2013.01); *G02B 6/3854* (2013.01); *G02B 6/3857* (2013.01); *G02B 6/3862* (2013.01); *H01R 43/01* (2013.01); *Y10T 29/49181* (2015.01)

(58) Field of Classification Search
  USPC ....... 29/861, 428, 432.1, 857, 862, 874, 882
  See application file for complete search history.

| Cleave optical fiber (F) | Assemble connector components (G) | Polish (H) | Inspection (I) | Package (J) |
|---|---|---|---|---|
| *Major activities:*<br>1. Mechanical or laser cleave the fiber protruding from face of ferrule<br><br>*Tool request:*<br>1. Laser cleaving/polishing tool(LCP)<br>2. Diamond tip for cutting fiber | *Major activities:*<br>1. Assemble the connector housing onto the assembled ferrule<br><br>*Tool request:*<br>1. Crimp tool<br>2. Other connector assembly tool if necessary<br>3. Connector body parts kit | *Major activities:*<br>1. Mechanical ground first round<br>2. Laser polish(Option-1)<br>3. Mechanical polish (Option-2)<br><br>*Tool request:*<br>1. Mechanical polishing tool<br>2. Laser cleaving/polishing tool(LCP) | *Major activities:*<br>1. Inspect fully terminated connector and ferrule end frace<br><br>*Tool request:*<br>1. End face interferometer<br>2. Concentricity machine<br>3. IL/RL tester<br>4. End face microscopy<br>5. Cleaning tool<br>6. Others if necessary | |

*FIG. 1C*

PROCESS FOR RESHAPING AND RESIZING GROOVES IN OPTICAL FIBER FERRULES

PRIORITY CLAIM

This application claims the priority of (a) U.S. Provisional Patent Application No. 62/384,154 filed on Sep. 6, 2016; (b) U.S. Provisional Patent Application No. 62/384,141 filed on Sep. 6, 2016; (c) U.S. Provisional Patent Application No. 62/384,143 filed on Sep. 6, 2016; and (d) U.S. Provisional Patent Application No. 62/384,146 filed on Sep. 6, 2016; which are fully incorporated by reference as if fully set forth herein. All publications noted below are fully incorporated by reference as if fully set forth herein.

BACKGROUND OF THE INVENTION

Field of the Invention

The present invention relates to fabricating optical fiber ferrules, and more particularly a fixture for shaping and sizing grooves in fabricating optical fiber ferrules.

Description of Related Art

There are many advantages of transmitting light signals via optical fiber waveguides and the use thereof is diverse. Single or multiple fiber waveguides may be used simply for transmitting visible light to a remote location. Complex telephony and data communication systems may transmit digitized data through optical signals within the waveguides. These applications couple fibers in an end-to-end relationship, with the coupling being one source of light loss. Precision alignment of two polished ends of fibers is needed to ensure that optical loss in a fiber link is less than the specified optical loss budget for a system. For single-mode telecommunication-grade fiber, this typically corresponds to connector fiber alignment tolerances that are less than 1000 nm. This means that in both parallel fiber and single fiber links, operating at multi-gigabit rates, the components applied to align the fibers must be assembled and fabricated with sub-micron precision.

In an optical fiber connection, an optical fiber connector terminates the end of a cable that contains one or multiple fibers, and enables quicker connection and disconnection as compared to splicing. The connectors mechanically couple and align the cores of fibers so that light can pass end-to-end. The end of an optical fiber is supported in a ferrule, with an end face of the optical fiber positioned generally flush with or slightly protruding from an end face of the ferrule. When complementary ferrules in connector assemblies are joined together, the optical fiber of one ferrule is aligned with a mating optical fiber of the other ferrule. In some applications, the end faces of mating optical fibers physically contact one another to effect signal transmission between the mating optical fiber pair. Better connectors lose very little light due to reflection or misalignment of the fibers. Connectors, in both parallel/multiple fiber and single fiber links, operating at multi-gigabit rates must be assembled with subcomponents fabricated with sub-micron precision.

U.S. Pat. No. 7,343,770, commonly assigned to the assignee of the present invention, discloses a novel precision stamping system for manufacturing small tolerance parts, including optical fiber ferrules. The disclosed stamping process involves stamping a stock material (e.g., a metal blank) to form the final overall external geometry of a ferrule and geometry of surface features including an optical fiber groove at tight (i.e., small) tolerances of below 1000 nm, whereby the groove is in precise alignment with the external alignment surface of the ferrule, for alignment to another ferrule using an external sleeve.

U.S. Pat. No. 7,311,449, commonly assigned to the assignee of the present invention, discloses various optical fiber ferrule configurations designed to be fabricated by the stamping process in U.S. Pat. No. 7,343,770, which make use of alignment sleeves for end-to-end coupling of two ferrules. Finally, optical fiber connectors incorporating ferrules as fabricated can achieve low insertion loss and low return loss, and which can be fabricated in high throughput and at low costs.

While the process disclosed in U.S. Pat. No. 7,343,770 was a technological breakthrough to achieving low cost, high throughput, precision manufacturing of optical fiber ferrules, further improvement is desired to develop a process to achieve tighter/smaller tolerances in optical fiber ferrules, e.g., for single mode fiber-optic transmissions, which can be fabricated in high throughput and at low costs.

SUMMARY OF THE INVENTION

The present invention provides a process involving reshaping and resizing at least one groove that was pre-formed in an optical fiber ferrule, and a fixture for undertaking reshaping and resizing of such groove.

One object of the present invention is to produce a cylindrical groove within semi-ferrules (or ferrule halves) that is precisely sized and shaped to create a slight compression fit around an optical fiber. The compression fit can hold the fiber within the ferrule assembly (comprising the two semi-ferrules) without the need for an epoxy adhesive. The ferrule assembly thus holds the glass optical fiber within the cylindrical hole, but this requires that the size and shape of the hole be nearly identical to the diameter of the optical fiber. Unfortunately, the diameters of optical fibers can vary by a few micrometers, which is similar to the amount of elastic compression desired in the compression fit. Therefore, the variability in the diameter of the fiber can adversely cause either too much or too little clamping force on the optical fiber, depending upon the production tolerances of the glass fiber.

The present invention overcomes the consequences from variability in the diameter of the glass fiber by using the optical fiber (made of a glass) as a tool to establish the size and shape of the cylindrical hole. Squeezing the ferrules together causes plastic deformation of the hole surrounding the fiber. The strength of the glass fiber is sufficient to withstand the compressive stress generated during this fiber-as-a-tool forming operation. Upon relaxing the squeezing force, the material in the hole springs back to produce a hole with a diameter that is slightly smaller than the diameter of the optical fiber. This slight interference produces an elastic interference fit of the optical fiber within the ferrule assembly. The result is a conformal groove that clamps the optical fiber within the ferrule without requiring an adhesive such as epoxy, despite the adverse variability in fiber diameters. Hereinafter, for convenience, a ferrule assembly may be simply referred to as a ferrule, since the disclosed embodiment of a ferrule comprises two ferrule halves.

In one aspect of the present invention, the inventive process is directed to termination of an optical fiber using a ferrule, involving reshaping and resizing at least one groove that was pre-formed in the ferrule, and a fixture to facilitate reshaping and resizing such groove.

In one embodiment of the present invention, the ferrule comprises a pair of complementary ferrule halves, each corresponding to a semi-ferrule (hereinafter, ferrule halve and semi-ferrule may be used interchangeably), which may be substantially similar in structure. Each ferrule halve has an external geometry such that when the two ferrule halves are joined together to form a ferrule, the overall external geometry of the ferrule is generally cylindrical (e.g., circular or oval cross-section). The external cylindrical surface of the ferrule is used to align with another ferrule in an end-to-end relationship using an external sleeve. Accordingly, each ferrule halve has a generally semi-circular or semi-oval cross-section, with a generally flat surface facing between the ferrule halves. Each ferrule halve is pre-formed with a groove for locating and receiving a bare section at the end of an optical fiber (with cladding exposed, without protective buffer and jacket layers). The groove on each ferrule halve has a semi-circular cross section. When the ferrule halves are joined together at the opposing flat surfaces, the opposing grooves form a cylindrical through-hole receiving a section of the optical fiber.

In one embodiment of the present invention, the ferrule halves are precision formed by high throughput processes, such as stamping a metal blank material. In one embodiment, the ferrule body is made of a metal material, which may be chosen to have high stiffness (e.g., stainless steel), chemical inertness (e.g., titanium), high temperature stability (nickel alloy), low thermal expansion (e.g., Invar), or to match thermal expansion to other materials (e.g., Kovar for matching glass). Each ferrule halve may be stamped to form a unitary or monolithic body, which does not require further attachment of sub-components within the ferrule halve.

In accordance with the present invention, the groove on each ferrule halve is further subject to a separate, subsequent shaping and sizing (i.e., reshaping and resizing) step using a tool or fixture. In one embodiment, the reshaping and resizing step is undertaken using a section of bare optical fiber (i.e., a bare section of optical fiber with cladding exposed, without protective buffer and jacket layers, as a shaping and sizing tool) as a gauge. In other words, the optical fiber is used as a gauge (i.e., a gauge optical fiber) in the tool to precisely shape and size the groove on the ferrule halve. In another embodiment, the reshaping and resizing step is undertaken using a gauge pin having an outer diameter similar to a bare section of optical fiber. The ferrule halves are pre-aligned to each other, and using the pre-formed grooves as guides for the gauge optical fiber or gauge pin, the ferrule halves are pressed together with the gauge optical fiber or gauge pin therebetween, thereby reshaping and resizing the respective grooves on the ferrule halves via plastic deformation of the material inside the cylindrical through-hole. After reshaping and resizing, the groove that is finally formed on each ferrule halve would be precisely shaped, sized and located with respect to the external surface (i.e., the contact surface to the external alignment sleeve) of the ferrule halve.

The section of the optical fiber used for reshaping and resizing is replaced with the bare end section of the optical fiber to be terminated with a ferrule. The ferrule halves are aligned and attached to each other with the end section of the optical fiber held in the grooves therebetween. The opposing ferrule halves are joined together, e.g., by laser welding. The end of the optical fiber is thus terminated by the ferrule, with the tip/end face of the optical fiber protruding slightly beyond the end face of the ferrule. The end face/tip of the optical fiber is polished (e.g., mechanically or using a laser) (the end face of the ferrule may be polished as well). The ferrule may be assembled with other components (e.g., ferrule housing, preload spring, boot, etc.) to form an optical fiber connector terminating the end of the optical fiber cable.

The ferrule has an external surface for alignment with a complementary surface of an external alignment sleeve (i.e., the inside surface of a generally cylindrical or tubular sleeve). The external surface of the ferrule is generally cylindrical, having a contact surface profile with a cross-section that is generally circular or oval. Two similarly terminated optical fibers can be optically coupled end-to-end by the alignment sleeve. In use, two similar ferrules are inserted into the alignment sleeve, with the opposing end faces of the optical fibers in the ferrules abutting against each other. In one embodiment, one of the ferrules may be a demountable terminal ferrule attached to an optical device (e.g., a housing of a hermetically sealed optoelectronic module OM).

In accordance with the present invention, given the subsequent precision reshaping and resizing step, the groove that was initially formed (or preformed) may not need to maintain a high tolerance with respect to shape (e.g., roundness) and size (e.g., width) of the groove, as long as the axis of the pre-formed groove had been accurately located with respect to the external alignment surface of the ferrule halve. From another perspective, a groove that was preformed at high tolerance will be further subject to precision reshaping and resizing, to thereby achieve even higher tolerance than the early preform step (e.g., by stamping).

The ferrule fabricated in accordance with the present invention further improves over the prior art, resulting in an optical fiber connector with low insertion and return losses, which provides ease of use, and which can be fabricated at low cost.

Accordingly, the present invention is directed to the features at least covered by the appended claims, which are incorporated by reference herein.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

FIGS. 1A-1C are schematic block diagrams illustrating an optical fiber termination process incorporating the inventive process, in accordance with one embodiment of the present invention.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

By way of illustration and not limitation, the inventive process involving reshaping and resizing pre-formed fiber grooves will be disclosed below in reference to an embodiment of a termination process for optical fiber ferrules, and further an embodiment of a ferrule or ferrule assembly having a pair of ferrule halves or semi-ferrules. In the present invention, it is understood that the term "ferrule" generally refers to a structure having a body structured and configured with at least a groove for supporting and/or aligning a section of optical fiber. In the embodiments disclosed herein below, the ferrule is configured with two ferrule halves that are joined together to terminate an optical fiber for making a demountable connection to another ferrule and/or a connection terminal (e.g., a pigtail) on an optical device.

Figure 1A:
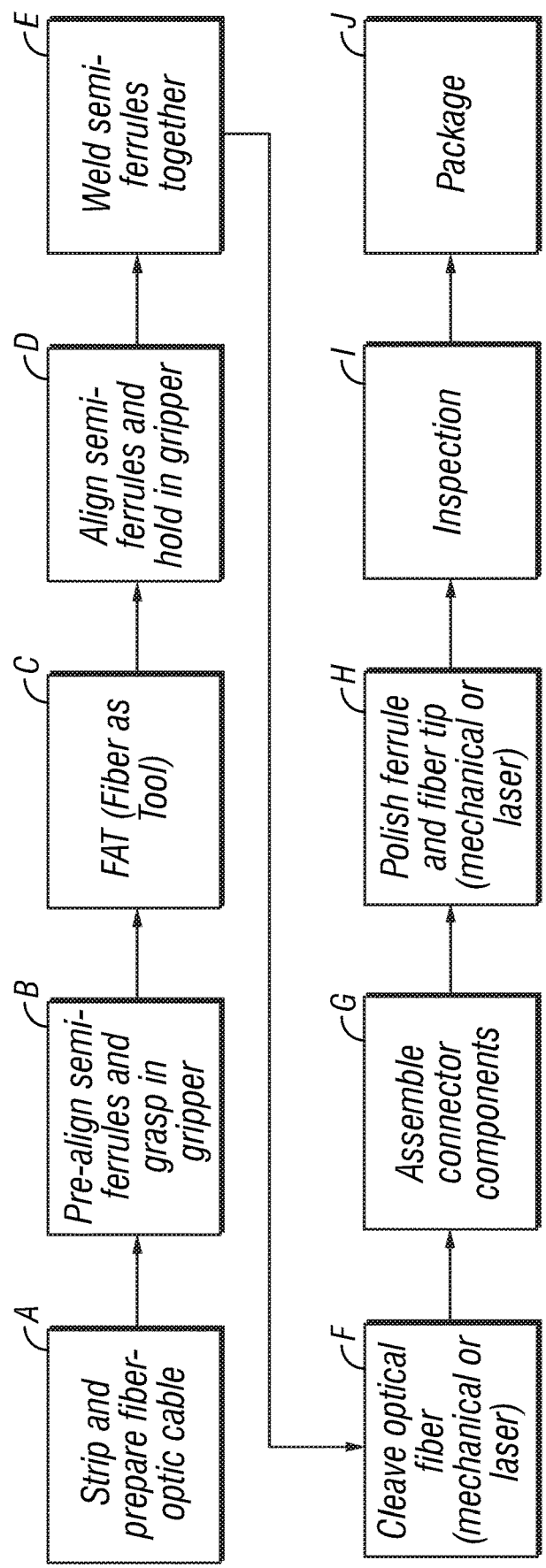
Figure 1B:
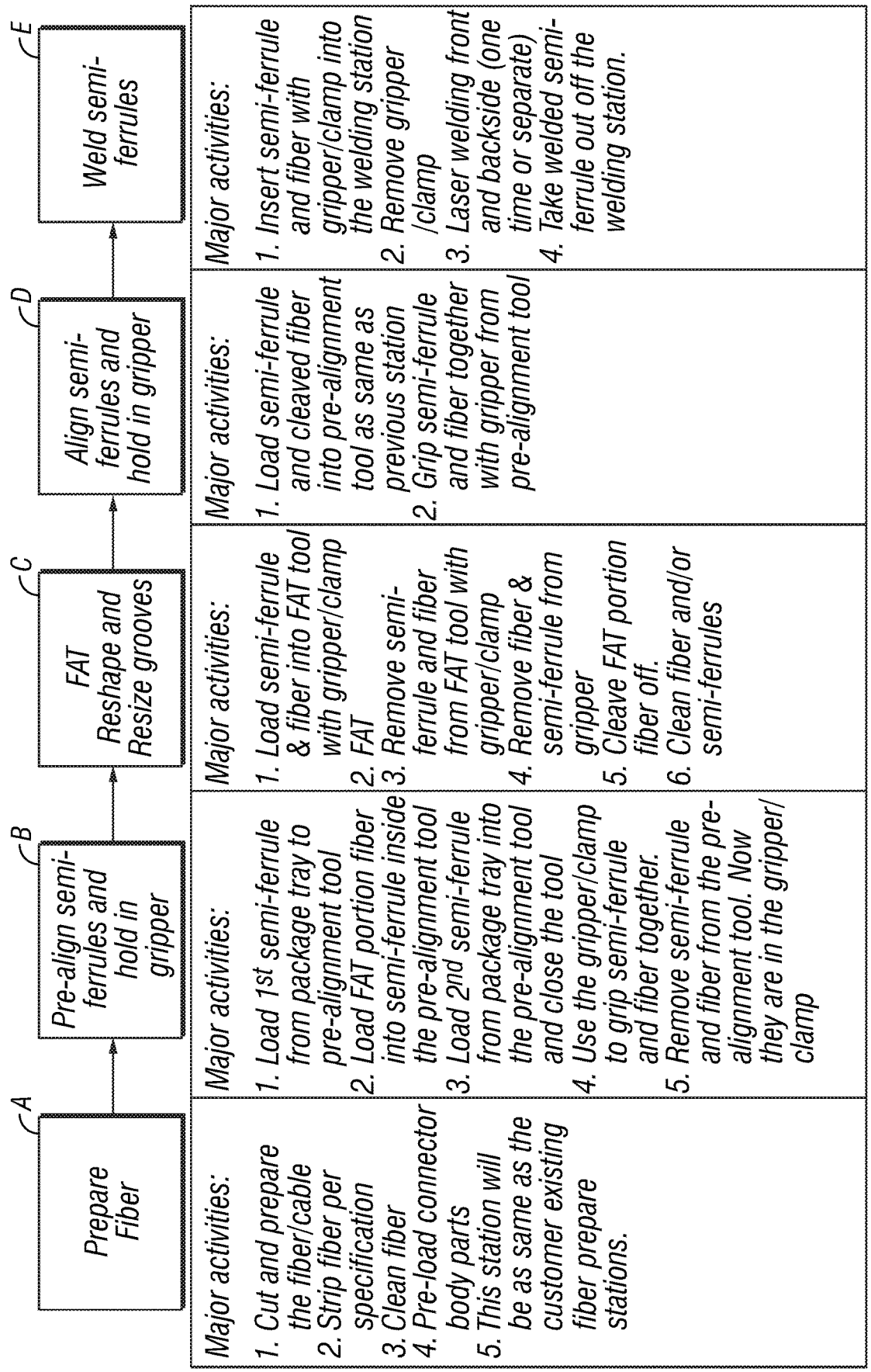

FIGS. 1A-1C are schematic block diagrams illustrating an optical fiber termination process incorporating the inventive process, in accordance with one embodiment of the present invention. FIG. 1A is a schematic overview of the inventive process. As shown in FIG. 1A, the process involves a sequence of undertakings, including, without exclusion of intermediate steps and/or undertakings, the following steps:

A—stripping the protective jacket and buffer to expose the cladding, and preparing a fiber-optic cable;

B—pre-aligning a pair of pre-formed semi-ferrules and placing a gauge tool between the pre-formed grooves in the semi-ferrules, and grasping the pre-aligned pair of pre-formed semi-ferrules in a gripper;

C—performing reshaping and resizing using the gauge tool (e.g., a fiber or a pin); in the illustrated embodiment, the gauge is a section of bare optical fiber, thus the optical fiber is used as a tool for reshaping and resizing the grooves; hence this step is referred to as a "fiber as tool" ("FAT") process step;

D—aligning semi-ferrules and holding in the gripper;

E—with the aligned semi-ferrules held in the gripper, welding the semi-ferrules together;

F—cleaving the optical fiber (mechanically or using a laser);

G—assembling connector components to complete an optical connector;

H—polishing the tip/end face of the optical fiber held in the ferrule;

I—inspecting finished part and quality control; and

J—packing part that passed inspection.

FIGS. 1B and 1C elaborate on each of the steps A to J, and will be further elaborated below where appropriate in connection with various tools and fixtures disclosed below in connection with the inventive process. It is noted that some of the steps shown in FIG. 1A and elaborated in FIGS. 1B and 1C may separately incorporate processes/steps known in the prior art (e.g., preparing fiber-optic cable, cleaving, polishing, inspection, packaging, etc.), which have been adapted in the manner described herein to accommodate the FAT process, which is not found in the prior art. Hence, the incorporation of FAT process in an overall termination process renders the overall process novel and non-obvious/involving inventive steps.

Figure 2A:
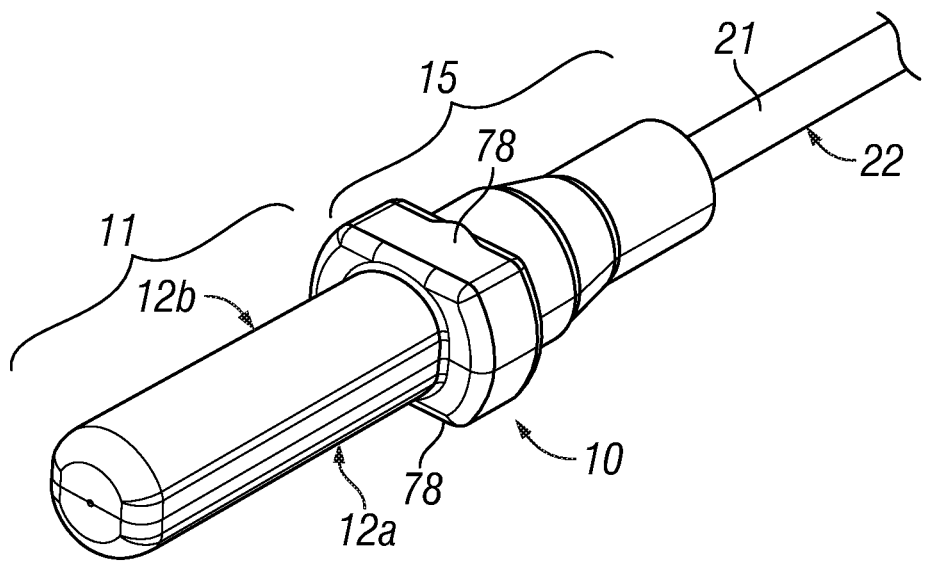
FIGS. 2A-2B illustrate an optical fiber cable terminated using a ferrule comprising two ferrule halves, in accordance with one embodiment of the present invention.
Figure 2B:
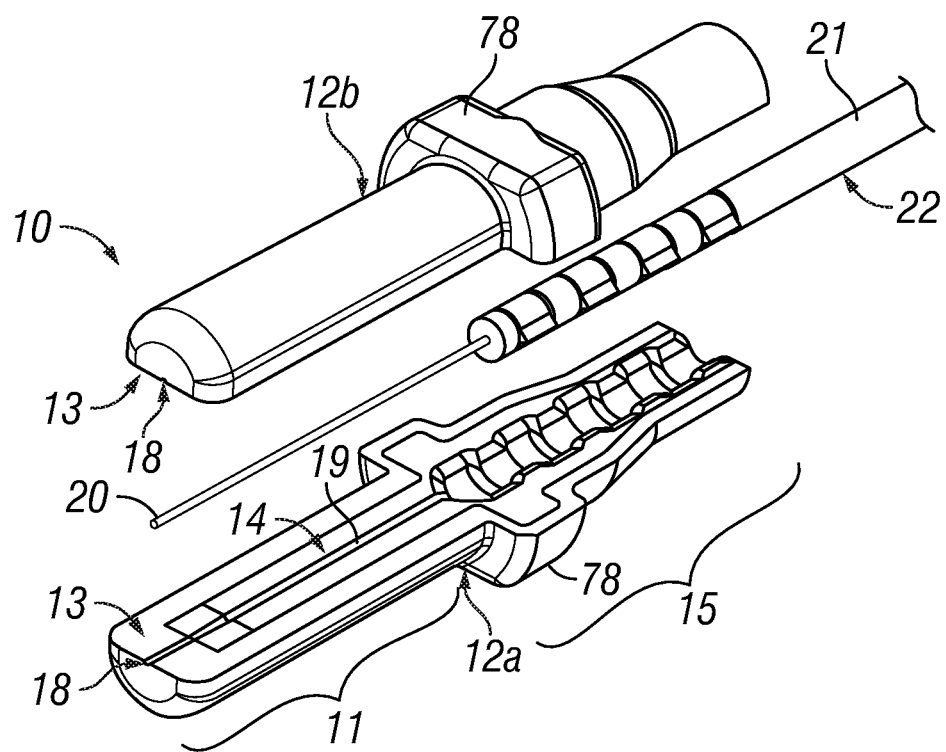

FIGS. 2A-2B illustrate an optical fiber cable terminated using a ferrule 10 in accordance with one embodiment of the present invention. The ferrule 10 was developed by the assignee of the present invention, and is being distributed under the trademark FERROLDER. The ferrule 10 comprises an assembly of a pair of complementary ferrule halves 12a and 12b (which may be singly or collectively referred to as ferrule halves 12, given their similar structure), each corresponding to a semi-ferrule (thus, ferrule halve and semi-ferrule may be used interchangeably herein), which may be substantially similar in structure, as illustrated. Each ferrule halve 12 has an external geometry such that when the two ferrule halves 12 are mated together to form the ferrule 10, the ferrule 10 includes an extended section 11 having an overall external geometry that is generally cylindrical, and in particular generally circular cylindrical (as shown in FIG. 1), and a crimp section 15 trailing from the cylindrical section 11. It is understood that the ferrule may have a different cylindrical cross-section, such as an oval cross-section, as disclosed in PCT Patent Application Publication No. WO2014/011283A2 (which had been commonly assigned to the assignee of the present invention, and which is fully incorporated by reference herein), which discloses an optical fiber connector that includes an optical fiber ferrule, which has a generally oval cross-section for aligning an array of multiple optical fibers to optical fibers held in another ferrule using a sleeve. The external surface of cylindrical section 11 of the ferrule 10 is used to align with another ferrule (which may be similar to ferrule 10, or backward compatible with prior art ferrules) in an end-to-end relationship using an external alignment sleeve (not shown).

FIG. 2B is an exploded view of the ferrule 10. Each ferrule halve 12 has a generally semi-circular cross-section, with a generally flat surface 13 opposing the other ferrule halve 12. The flat surface 13 extends adjacent the perimeter, including the sides and the distal end, of the cylindrical section 11. The flat surface 13 near the distal tip is preformed with a groove 18 for locating and receiving a bare section at the end of an optical fiber 20 (with cladding exposed, without protective buffer and jacket layers 21) in an optical fiber cable 22. As will be described in greater details below, this pre-formed groove 18 will be subsequently reshaped and resized by the FAT process in accordance with the present invention, which will then accurately position and align the end section of the optical fiber 20 with respect to the external cylindrical alignment surface of the ferrule 10.

Within the space bordered by the flat surface 13, a cavity 14 is provided, which includes a wider groove 19 to relatively loosely accommodate the optical fiber 20 behind the groove 18. The groove 19 is not used for alignment of the optical fiber 20, hence it does not need to be formed at high tolerance. The cavity 14 extends to the crimp section 15, with an internal geometry that accommodates the cable jacket 21. Reference is made to U.S. Pat. No. 9,091,833 (which had been commonly assigned to the assignee of the present invention, and which is fully incorporated by reference herein), which discloses a cable retention structure defining a castellated fiber cable clamping surface. The castellated surface has a series of alternating small and large cavities distributed along the axial direction. The cable jacket is securely held by the retention structure to prevent slipping of the cable jacket.

The pre-formed groove 18 on each ferrule halve has a generally semi-circular cross section. When the ferrule halves 12a and 12b are attached by mating at the opposing flat surfaces 13, the opposing grooves 18 form a generally circular cylindrical through hole receiving the end section of the optical fiber 20.

In one embodiment of the present invention, the ferrule halves 12 are precision pre-formed by high throughput processes, such as stamping a metal stock material (e.g., a metal blank). Reference is made to the precision stamping process disclosed in U.S. Pat. No. 7,343,770, which had been commonly assigned to the assignee of the present invention, and which was fully incorporated by reference herein. The disclosed stamping process involves stamping a stock material (e.g., a metal blank) to form the final overall external geometry of a ferrule and geometry of surface features including an optical fiber groove at tight (i.e., small) tolerances of below 1000 nm, whereby the groove is in precise alignment with the external alignment surface of the ferrule, for alignment to another ferrule using an alignment sleeve. U.S. Pat. No. 7,311,449, which had been commonly assigned to the assignee of the present invention, and which was fully incorporated by reference herein, discloses embodiments of ferrules that could be formed by the precision stamping process disclosed in U.S. Pat. No. 7,343,770.

The ferrule halves 12 may be pre-formed by similar processes. It is noted that the pre-formed ferrule halve 12 would include the external curved alignment surface precisely formed in relation to the axis of the groove 18, so that after the groove 18 is subject to reshaping and resizing, and the ferrule halves 12 have been assembled to produce the ferrule 10, the axis of the resultant groove conforms to the optical axis of the optical fiber 20, which would be in precise positional relationship to the exterior cylindrical alignment surface of section 11 of the ferrule 10. The reshaping and resizing procedures discussed herein below does not alter the external alignment surfaces of the ferrule halves 12 and the axis of the preformed groove 18. In other words, the axis of the preformed groove 18 as well as the axis of the resultant reshaped and resized groove would be in the same precise positional relationship to the external alignment surfaces of the ferrule halves 12.

In one embodiment, the ferrule body is made of a metal material, which may be chosen to have high stiffness (e.g., stainless steel), chemical inertness (e.g., titanium), high temperature stability (nickel alloy), low thermal expansion (e.g., Invar), or to match thermal expansion to other materials (e.g., Kovar for matching glass). Each ferrule halve may be stamped to form a unitary or monolithic body, which does not require further attachment of sub-components within the ferrule halve.

Figure 3A:
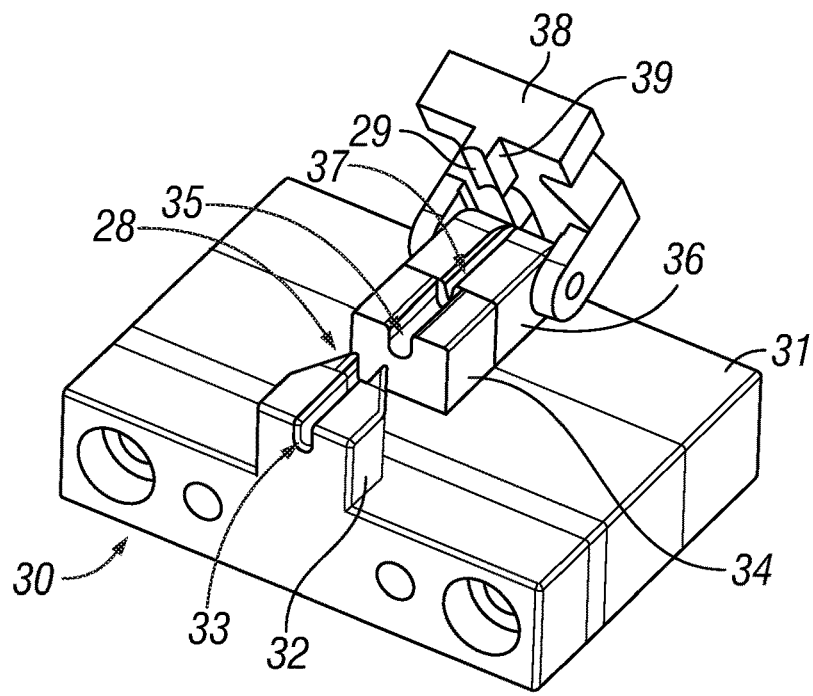
FIGS. 3A-3G illustrate a tool for pre-aligning a pair of ferrule halves for further processing, in accordance with one embodiment of the present invention.
Figure 3B:
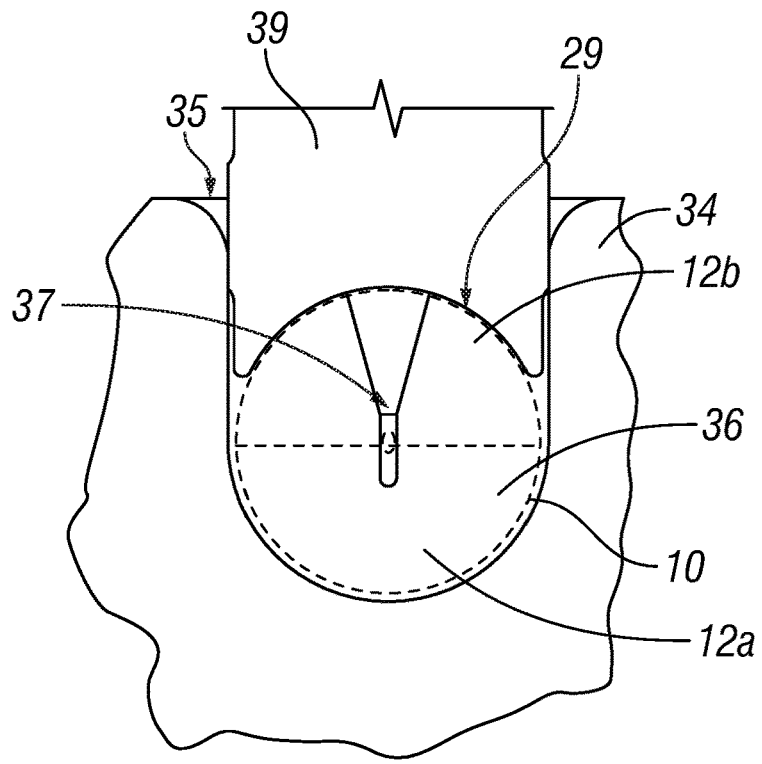

FIGS. 3A-3G illustrate a tool 30 for pre-aligning a pair of pre-formed ferrule halves 12 for further processing, in accordance with one embodiment of the present invention. The alignment tool 30 includes a base 31, on which is provided: (a) a support 32 having a generally U-shaped channel 33 having a wide portion for receiving the small end of the crimp section 15 of a ferrule halve and a narrow portion for receiving an optical fiber cable jacket 21, (b) a support 34 having a generally U-shaped channel 35 for receiving the cylindrical sections 11 of two ferrule halves 12, and (c) a support 36 having a channel 37 for receiving a bare section of optical fiber 20. The centerlines of the channels 33, 35 and 37 are precision aligned to be collinear. The support 34 is separated from the support 32 by a space 28 that accommodates the wider end of the crimp section 15 of the ferrule halve 12. A cover 38 is pivotally supported by the support 36. The cover 38 is sized to extend to cover the channel 35 in support 34 when pivoted to a closed position. A chuck 39 protrudes below the distal edge of the cover 38, which is received in the channel 35 in support 34. The chuck 39 has a semi-cylindrical concave distal surface, which conforms to the external alignment semi-cylindrical surface of a ferrule halve 12. FIG. 3B is a view from the space 28, along the channel 35 of the support 34. The outline of the cylindrical alignment surface of the ferrule 10 (comprising the external alignment surfaces of the ferrule halves 12) is schematically represented by a dotted line in FIG. 3B. The base 31 may be assembled from separate components that are precisely assembled together, with the centerlines of the channels 33, 35 and 37 precisely aligned.

Figure 3C:
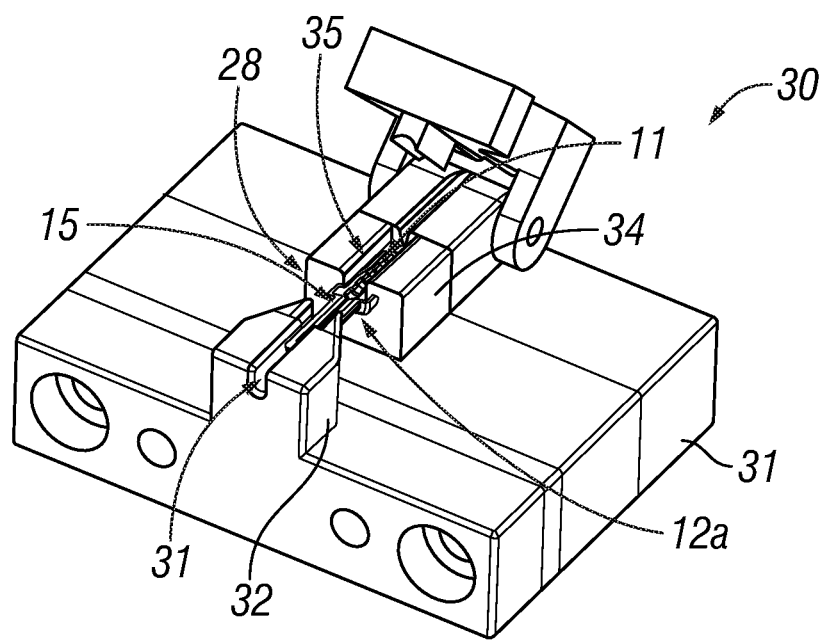
Figure 3D:
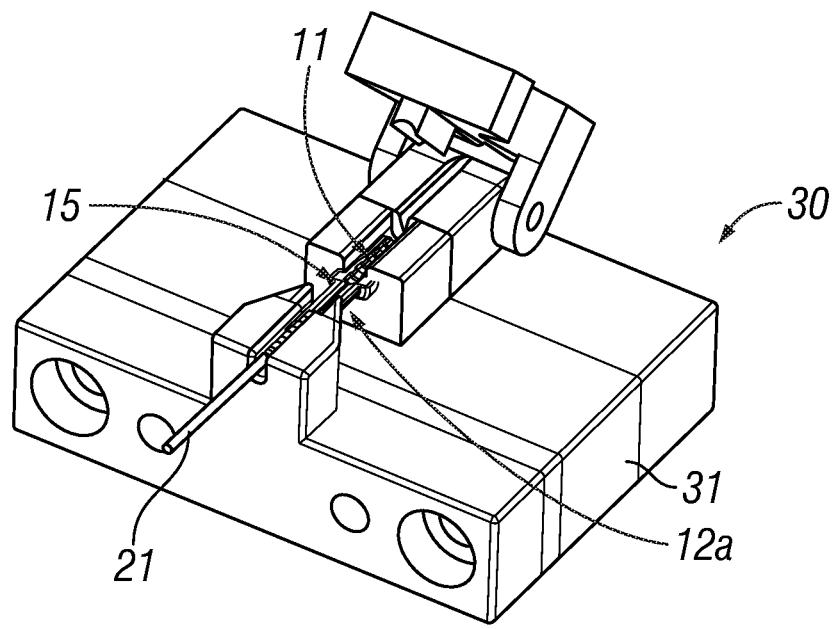

The operation of the tool 30 is best understood by reference to FIG. 3C to 3G. In FIG. 3C, a first ferrule halve 12a is supported at the bottom of the channel 33 and 35, across the space 28, with the flat surface 13 facing up. In particular, the cylindrical section 11 of the ferrule halve 12b is received in the channel 35, and the smaller end of the crimp section 15 is received in the wider portion of channel 35, with the larger end of the crimp section 15 received in the space 28 between support 32 and 34. The large end of the crimp section 15 abuts against the face (a reference surface) of support 34. In FIG. 3D, an optical fiber cable 22 with a bare section of optical fiber 20 loaded in the groove 18 of the ferrule halve 12a and the jacket 21 loaded in the crimp section 15 of the ferrule halve 12a and the channel 33. The tip of the bare section of optical fiber 20 extends from the tip of the cylindrical section 11, into the channel 37.

Figure 3E:
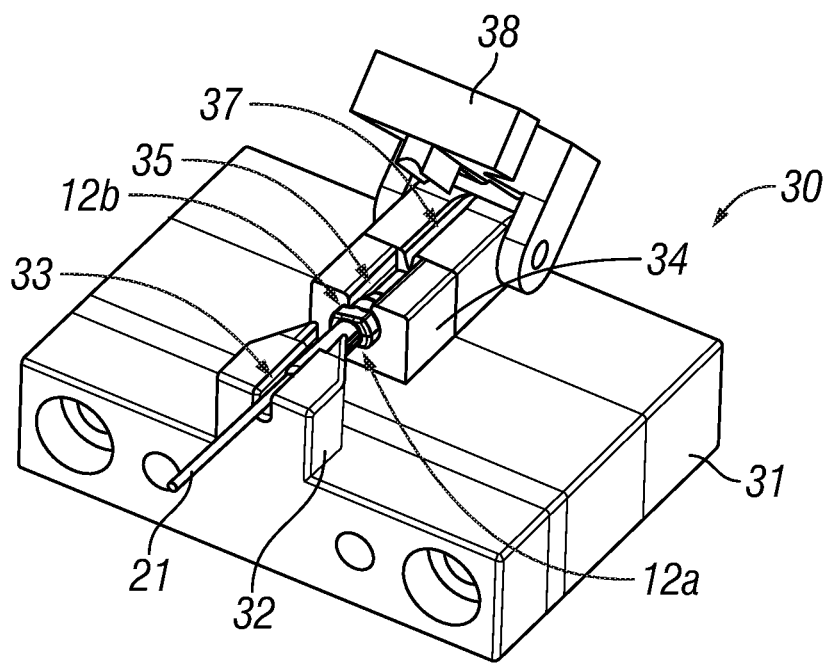

In FIG. 3E, a second ferrule halve 12b is loaded over the ferrule halve 12a and the optical fiber 20 supported therein, with the crimp section 15 and the cylindrical section 11 including opposing flat surfaces 13 vertically aligned by the channels 33 and 34. The large end of the crimp section 15 of the ferrule halve 12b abuts against the reference face of the support 34, thus aligning the ferrule halves 12a and 12b along their axis. The channels 33 and 35 align the lateral positions of the ferrule halves 12a and 12b.

Figure 3F:
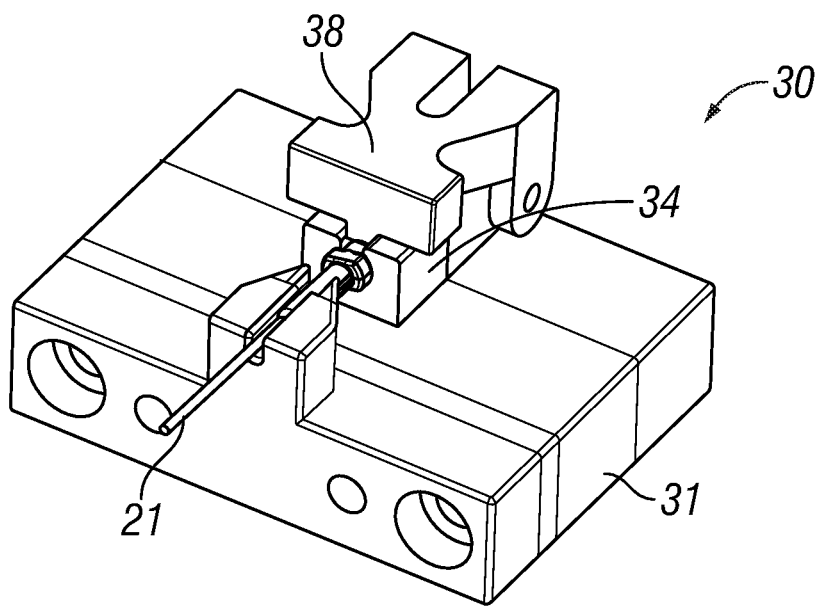
Figure 3G:
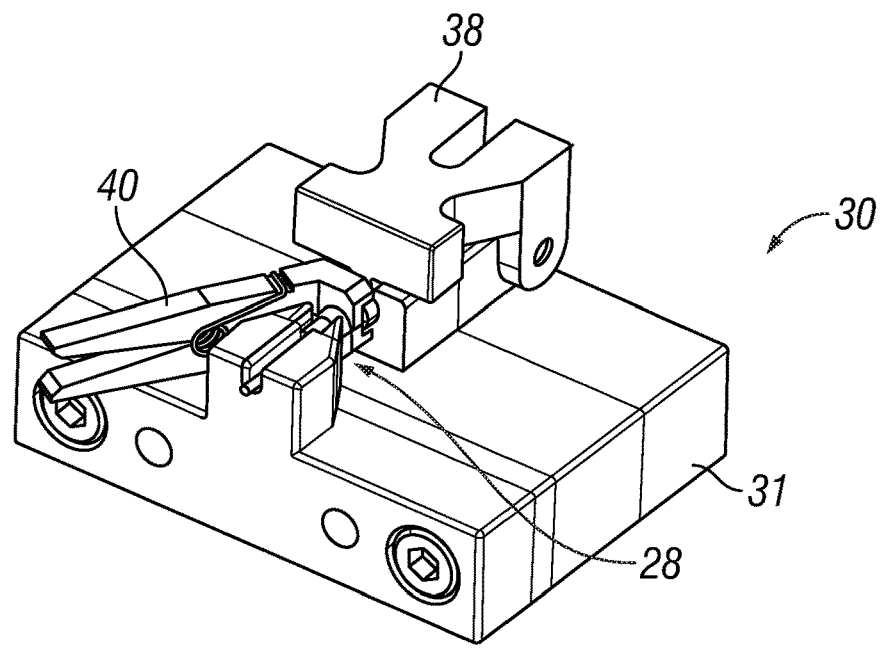

In FIG. 3F, the cover 38 is pivoted to cover the channel 35 in support 34, in the configuration shown in FIG. 3B. The chuck 38 extends into the channel 35, with the semi-cylindrical concave surface 29 pressed upon the conforming semi-cylindrical surface of the ferrule halve 12b. In this configuration, the ferrule halves 12a and 12b are precisely aligned, with the optical fiber 20 in the opposing groove 18 of the ferrule halves. In FIG. 3G, a gripper 40 is applied clamp on the section of crimp section 15 exposed in the space 28, which maintains the relative positions of the ferrule halves 12, by restricting six-degree movement of the ferrule halves 12. The ferrule halves 12 with the optical fiber 20 can be removed from the tool 30 in an aligned state by handling the gripper 40.

FIGS. 5A-5D illustrate various views and details of the gripper 40 for grasping a pair of ferrule halves for transferring between processing stations, in accordance with one embodiment of the present invention. The opposing jaws 26a and 26b are shaped and spring biased to clamp against and around the crimp sections of the ferrule halves 12, thus providing six-degree of restriction to relative movement of the ferrule halve 12a and 12b. The ferrule halves 12 may be moved to another processing station (e.g., to and from the FAT processing station in step C in FIG. 1) by handling the gripper 40, without affecting the relative positions of the ferrule halves 12.

In particular, in the embodiment of the termination process disclosed in FIG. 1, the alignment procedures using the tool 30 discussed above and illustrated in FIG. 3 may be applied in the pre-alignment step B pre-FAT operation and/or the alignment step D post-FAT operation in FIG. 1. The differences between the pre-alignment step B and the alignment step D is primarily in the preformed grooves 18 pre-FAT operation and reshaped and resized grooves 18 post-FAT operation.

Figure 4A:
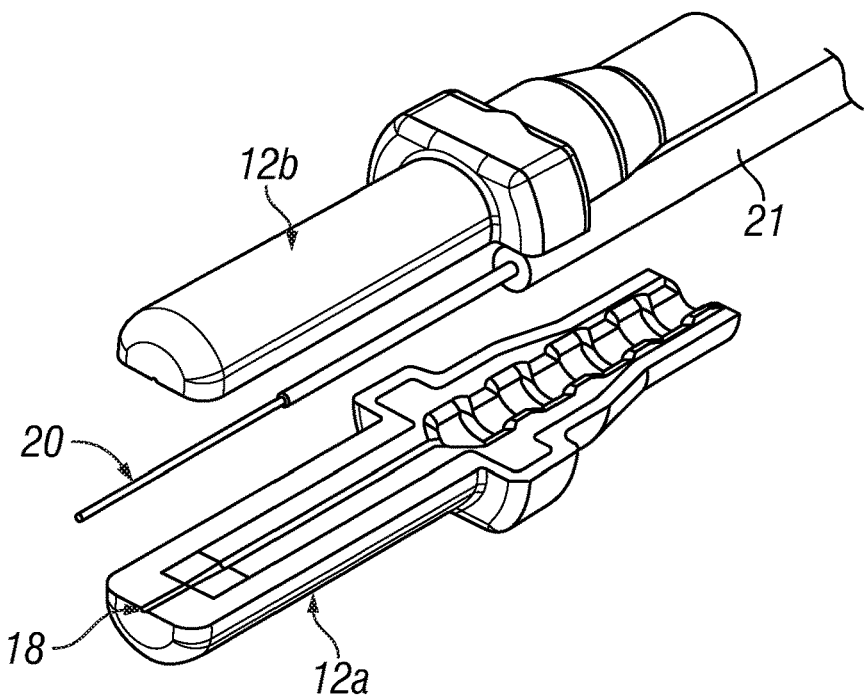
FIG. 4A illustrates ferrule groove reshaping and resizing using a bare section of optical fiber as a gauge, in accordance with one embodiment of the present invention.
Figure 4B:
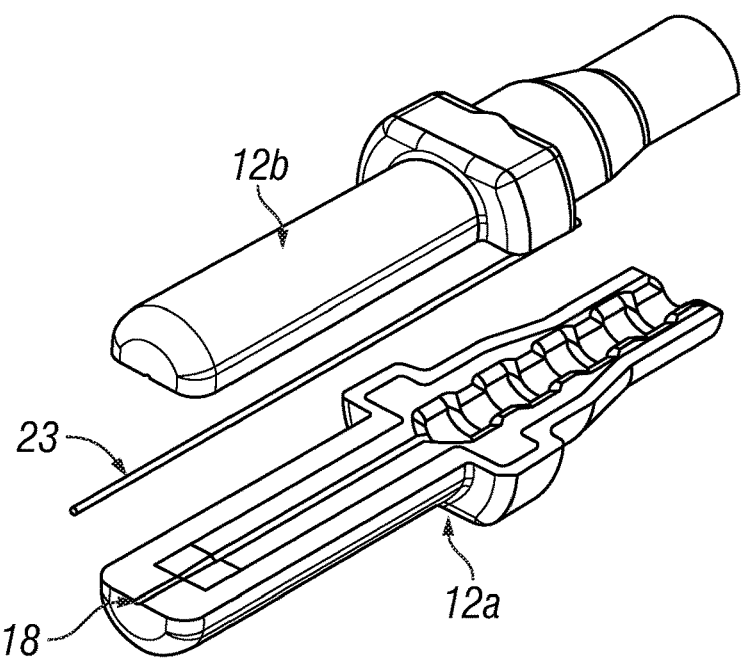
FIG. 4B illustrates ferrule groove reshaping and resizing using a pin as a gauge, in accordance with one embodiment of the present invention.
Figure 5A:
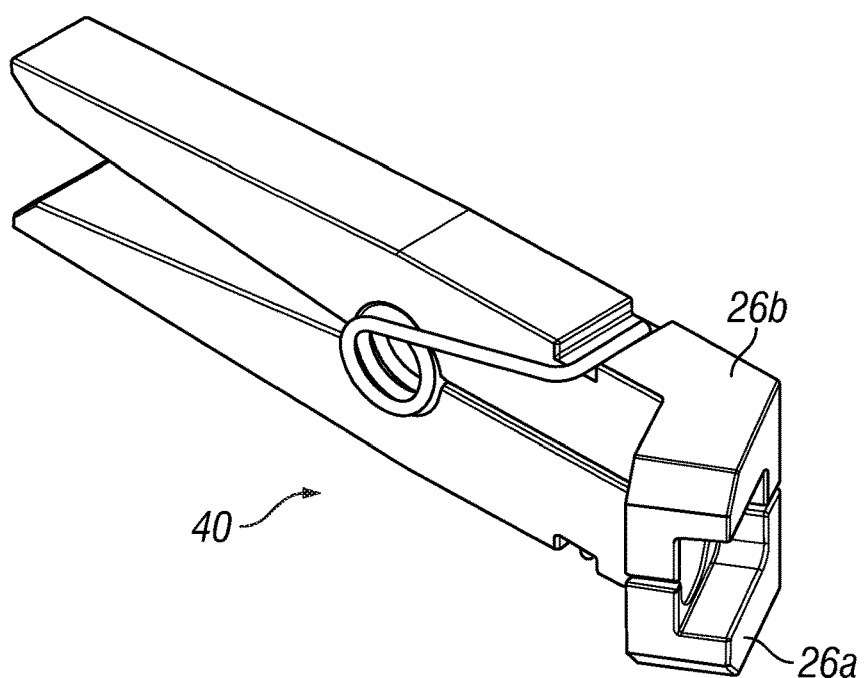
FIGS. 5A-5D illustrate various views of a gripper for grasping a pair of ferrule halves for transferring between processing stations, in accordance with one embodiment of the present invention.
Figure 5B:
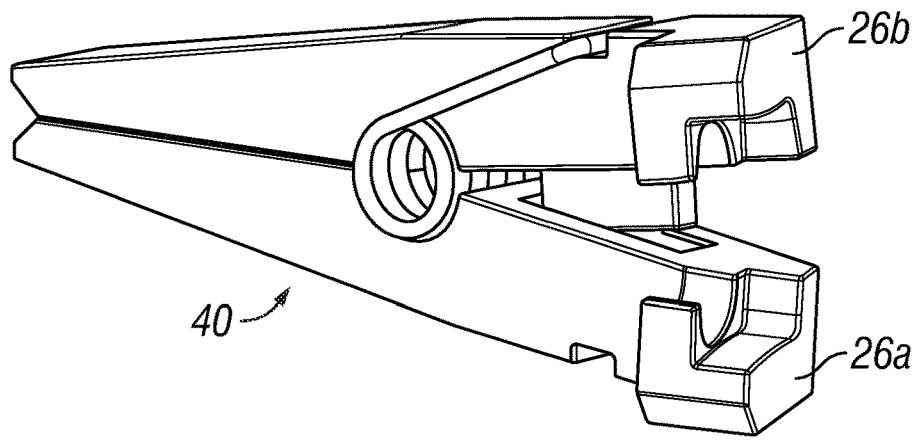
Figure 5C:
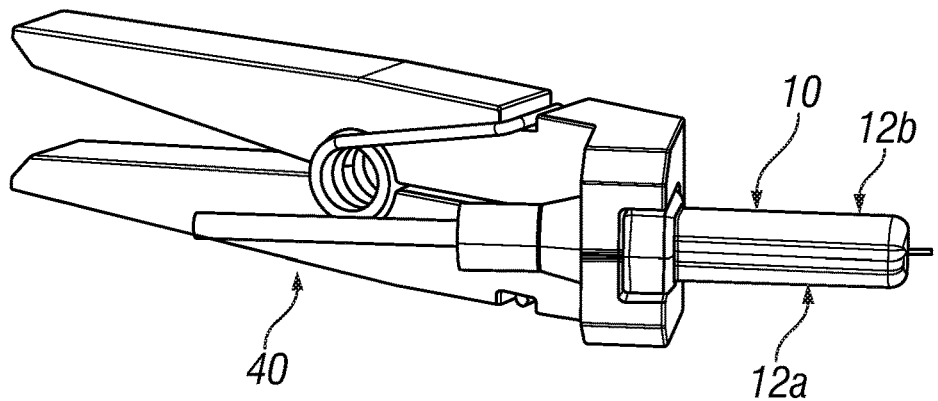
Figure 5D:
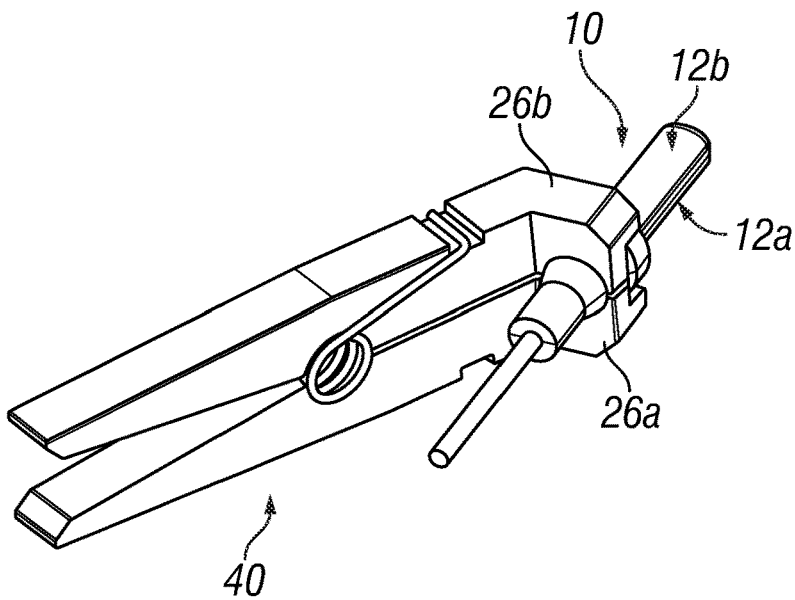

In step B in FIG. 1, a bare section of optical fiber 20 is pre-aligned to the ferrules halves 12 that include grooves 18 that were pre-formed, e.g., by stamping. In accordance with the present invention, the groove on each ferrule halve is further subject to a separate, subsequent shaping and sizing operation (i.e., reshaping and resizing) in step C (i.e., involving the FAT operation) using a tool or fixture. In this embodiment, the reshaping and resizing step is undertaken using a section of bare optical fiber (i.e., a bare section of optical fiber 20 with cladding exposed, without protective buffer and jacket layers, as a shaping and sizing tool) as a gauge. In other words, the optical fiber is used as a gauge (i.e., a gauge optical fiber) in the tool to precisely shape and size the groove on the ferrule halve. FIG. 4A illustrates ferrule groove reshaping and resizing using a bare section of optical fiber as a gauge, in accordance with one embodiment of the present invention. In an alternate embodiment, the reshaping and resizing step is undertaken using a gauge pin having an outer diameter similar to a bare section of optical fiber. FIG. 4B illustrates ferrule groove reshaping and resizing using a pin 23 as a gauge, in accordance with one embodiment of the present invention.

After the ferrule halves 12 are pre-aligned to each other in step B, and using the pre-formed grooves as guides for the gauge optical fiber or gauge pin, the ferrule halves 12 are pressed together with the gauge optical fiber 20 or gauge pin 23 therebetween, thereby reshaping and resizing the respective grooves on the ferrule halves.

Figures 6A, 6B:
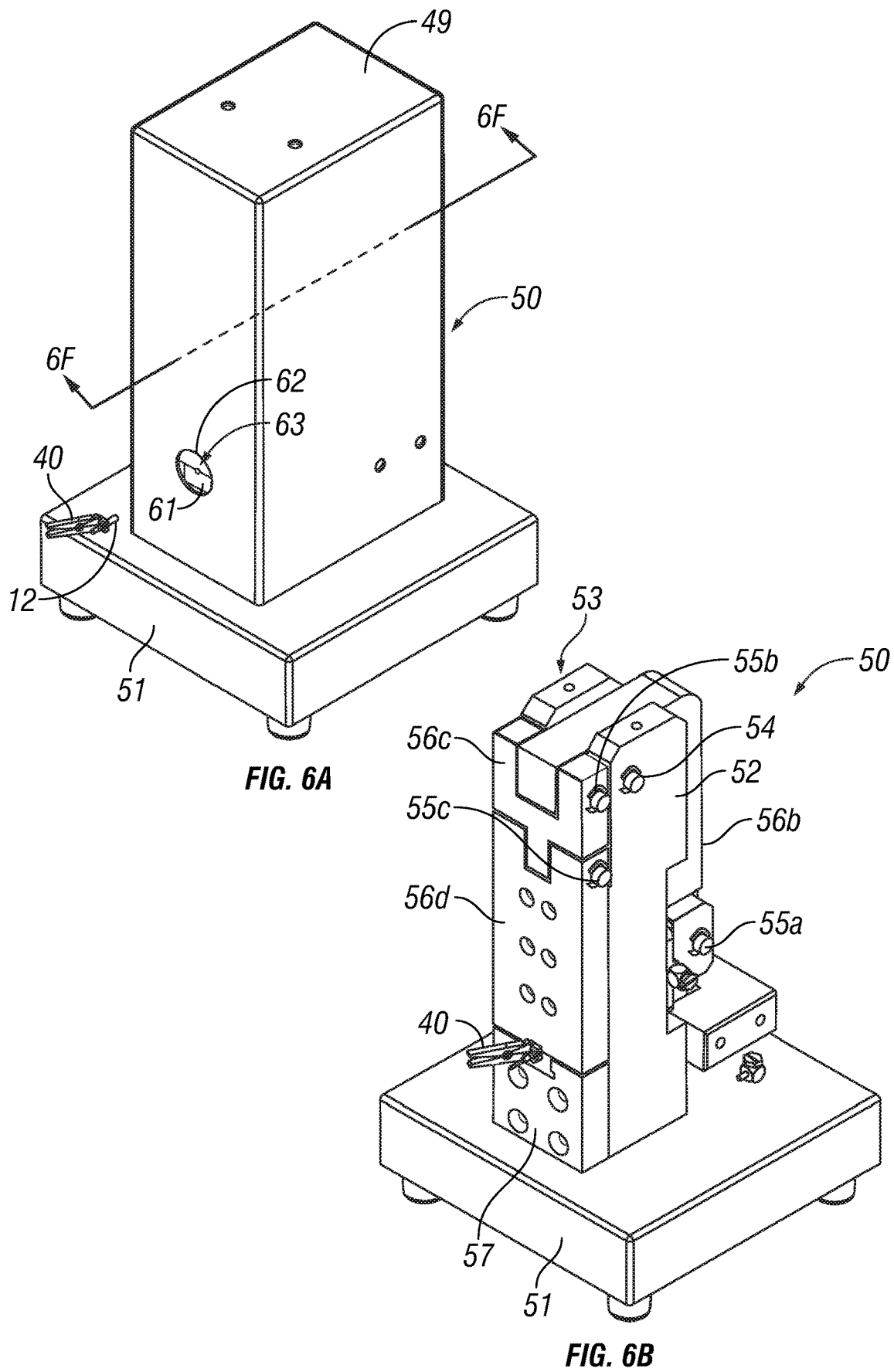
FIGS. 6A-6G illustrate various views of a tool for reshaping and resizing grooves in a pair of ferrule halves, in accordance with one embodiment of the present invention.
Figure 6C:
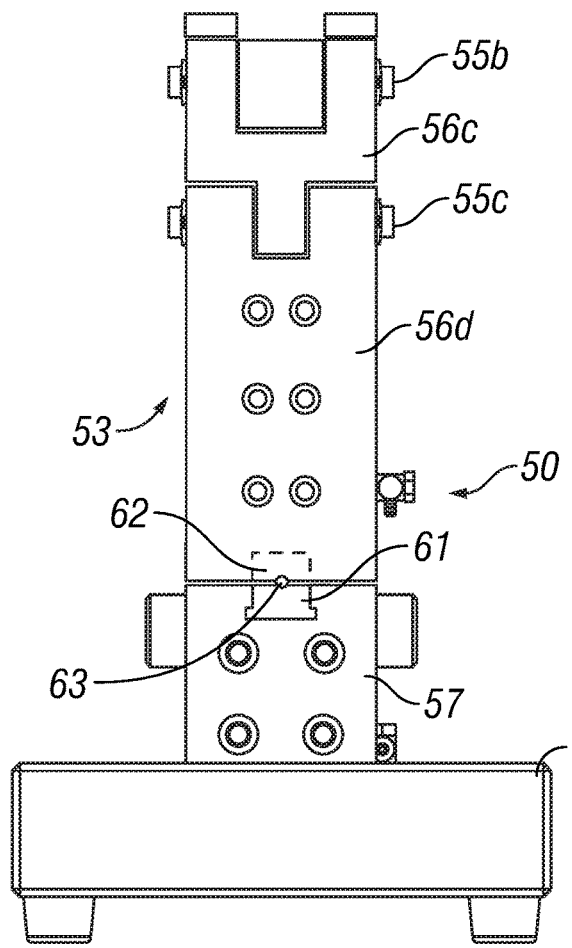
Figure 6D:
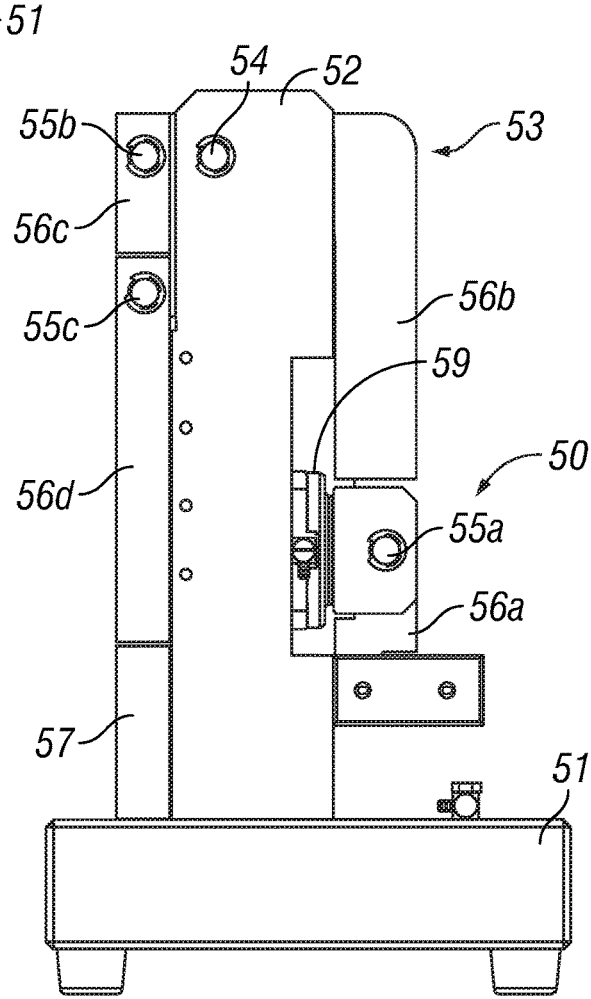
Figure 6E:
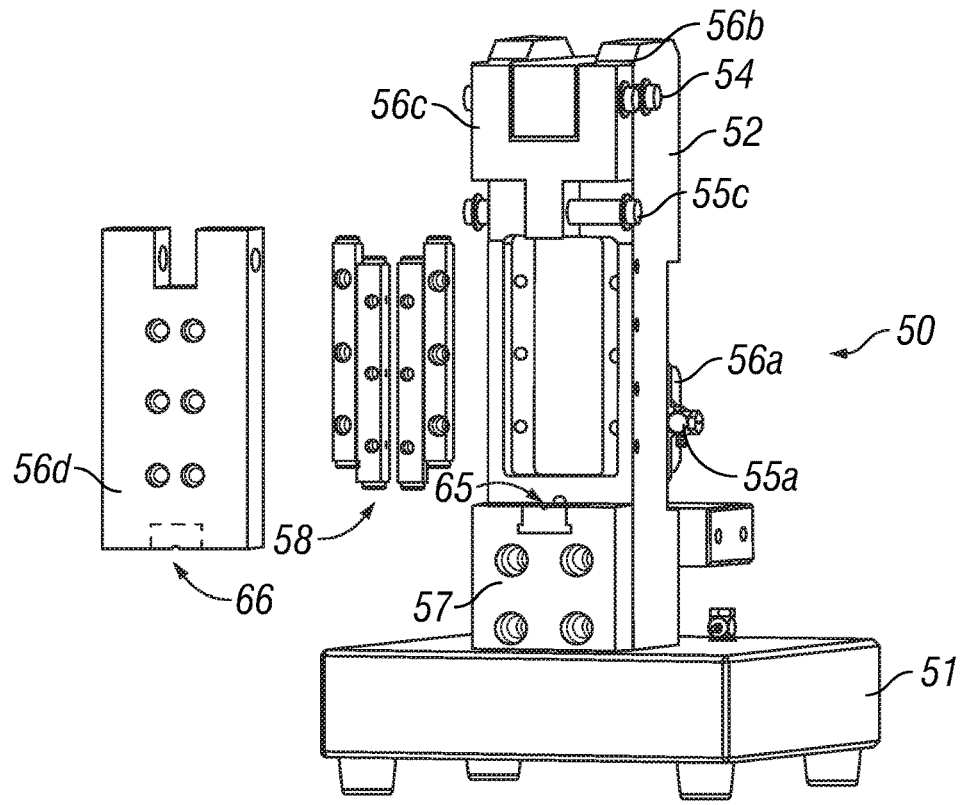
Figure 6F:
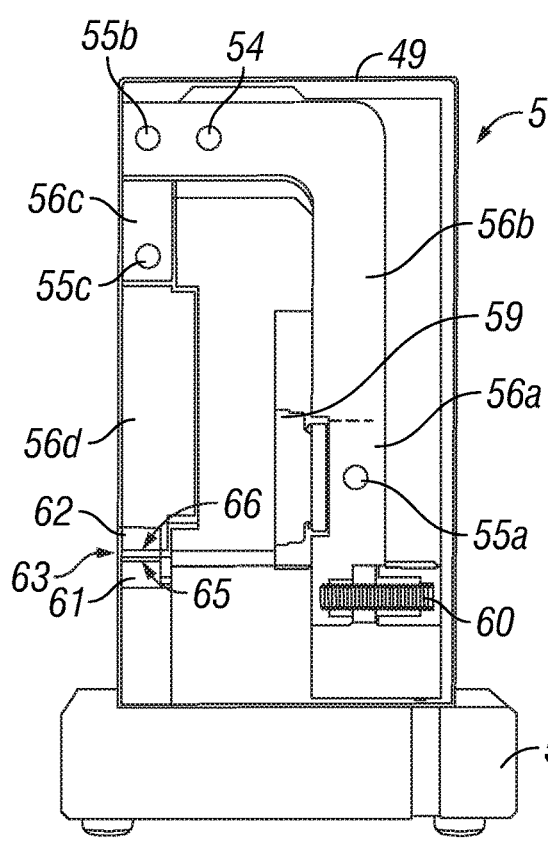

FIGS. 6A-6G illustrate various views of a tool 50 used in connection with step C in FIG. 1, to undertake the FAT operation for reshaping and resizing grooves in a pair of ferrule halves, in accordance with one embodiment of the present invention. FIGS. 6B to 6E are various views of the tool 50 with the cover 49 removed. FIG. 6F is a sectional view taken along line 6F-6F in FIG. 6A. The tool 50 includes a base 51 supporting a vertically extending support frame 52. A rocker four-bar linkage 53 is supported on the frame 52. Referring also to the side view in FIG. 6G, the four bars 56a, 56b, 56c and 56d of the linkage 53 are pivotably connected by three revolute joints 55a, 55b and 55c. The linkage 53 is pivotably coupled to the frame 54 at pivot 54. A stationary lower jaw assembly 57 is attached to the foot of the front of the frame 52, which includes a lower jaw 61 having a semi-circular groove 65 provided at its upper edge. The bar 56d corresponds to an upper jaw assembly having an upper jaw 62 attached at its bottom edge, which has a semi-circular groove 66 provided at its edge (see FIG. 6F). The lower and upper jaws 61 and 62 when mated together, the grooves 65 and 66 define a through opening 63 having a precise diameter corresponding to the outside diameter of the cylindrical section 11 of the ferrule 10. The bar 56d is slidably connected to the front of the frame 52 by a prismatic joint 58 (e.g., a high precision cross roller slider as shown in the exploded view of FIG. 6E) providing upper jaw movement in vertical linear direction, with accuracy, e.g., within 200 nm in traverse direction. A pneumatic actuator 59 is supported on the rear of the frame 52, which pushes the bar 56a against compression of a bias spring 60. The lower and upper jaws 61 and 62 can be inserts fitted into T-grooves on the lower assembly 57 and bar 56d (which corresponds to the upper jaw assembly).

Figure 6G:
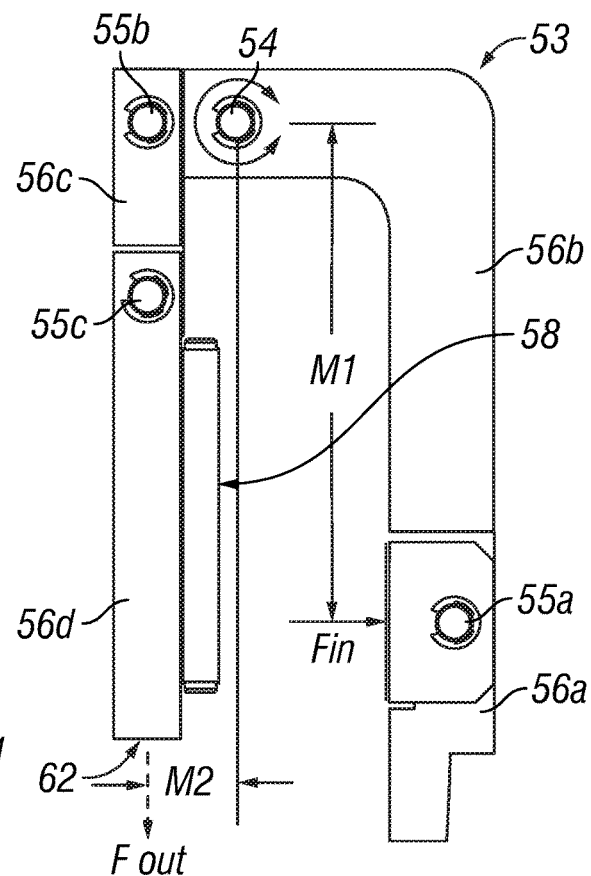

Referring to FIGS. 6F and 6G, the operation of the four-bar linkage 53 moves the upper jaw assembly/bar 56d with respect to the lower jaw assembly 57. When the pneumatic actuator 59 is operated to push out against the bar 56a with an input force Fin, a moment is imparted on bar 56b to cause it to rotate counter-clockwise about pivot 54, which imparts a moment on the bar 56c to cause it to move downwards, thereby pushing on the upper jaw assembly/bar 56d to slide vertically downwards along prismatic joint 58 with an output force Fout. The opening 63 between the jaws is in a state conforming to the outside diameter of the cylindrical section 11 of the ferrule 10. Upon release of the force Fin by the actuator 59, the spring 60 decompresses, pushing the bar 56a to rotate clockwise about pivot 54, thus lifting the bar 56c to thereby pull the upper jaw assembly/bar 56d to slide vertically upwards along prismatic joint 58. The opening 63 is thereby relaxed, allowing insertion/removable of a pair of ferrule halves 12a and 12b. Referring to FIG. 6G, given the moment arm M1 between the force Fin and the pivot 54, is significantly greater than the moment arm M2 between the force Fout and the pivot 54, a mechanical advantage is achieved (e.g., a mechanical advantage of 5 to 10), whereby the force Fout is significantly greater than the force Fin (e.g., 5 to 10 times greater).

Figure 7A:
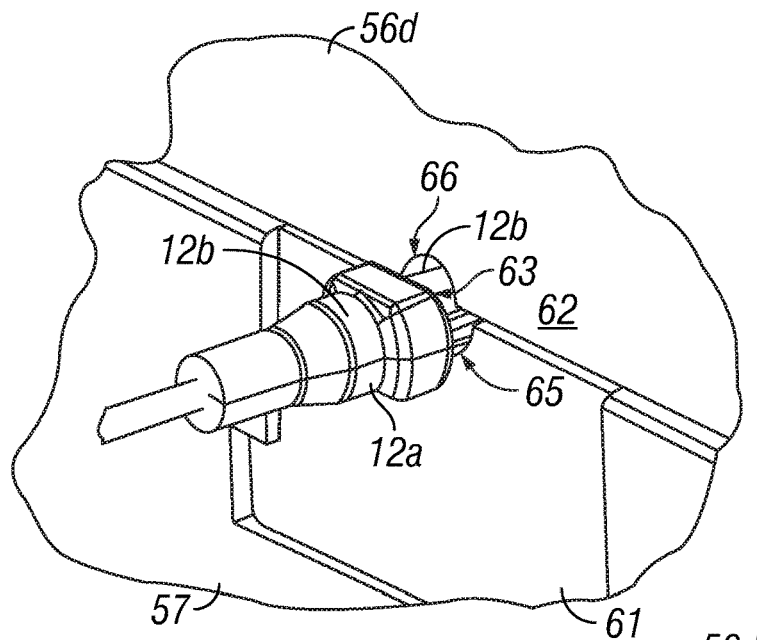
FIGS. 7A-7C illustrate pressing of the pair of ferrule halves to reshape and resize the grooves on the ferrule halves, in accordance with one embodiment of the present invention.
Figure 7B:
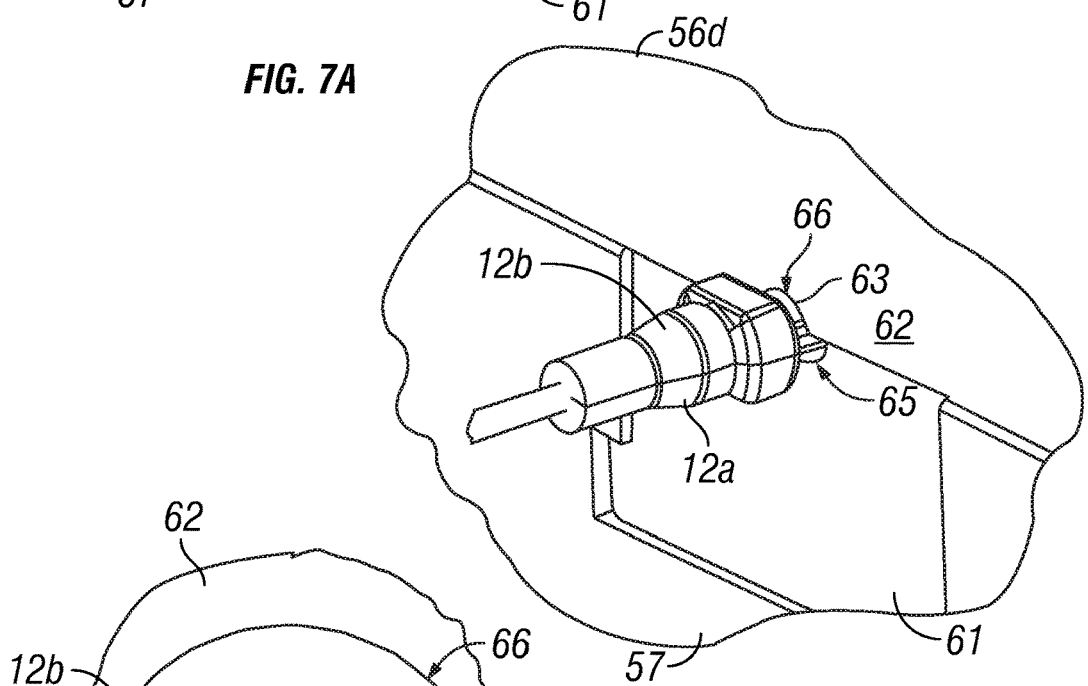
Figure 7C:
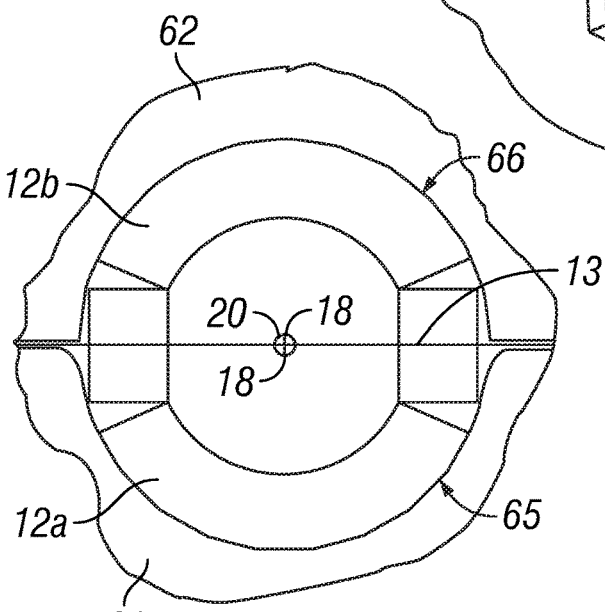

As shown in FIGS. 6A and 6B, to carry out FAT operation, the gripper 40 holding the ferrule halves 12 and optical fiber is brought to the FAT tool 50, and the ferrule halves 12 and optical fiber 20 is inserted into the relaxed opening 63 between the grooves 65 and 66 in the FAT tool 50, with the lower and upper jaws 61 and 62 in an open state. FIGS. 7A-7C illustrate pressing of the pair of ferrule halves 12 to reshape and resize the grooves on the ferrule halves, in accordance with one embodiment of the present invention. FIG. 7A illustrates the relaxed state of the opening 63 in the open state prior to pressing, with the upper jaw 62 not touching the upper ferrule halve 12b. With the gripper 40 in place, by operating the actuator 59 to impart an input force Fin on the bar 56a, the upper jaw 62 moves towards the lower jaw 61 to reduce the opening 63, thereby pressing on the pair of ferrule halves 12a and 12b with an output force Fout (e.g., a 300 lb force). FIG. 7B illustrates that lower and upper jaws 61 and 62 closing to compress the ferrule halves 12a and 12b, with the upper jaw 62 now touching/pressing on the upper ferrule halve 12b. With the optical fiber 20 between the ferrule halves 12a and 12b, the compression of these ferrules halves together further shape and size (i.e., reshaping and resizing) the grooves 18 around the optical fiber 20, with the exterior cylindrical surface of the overall ferrule 10 conforming to the size of the opening 63 in the close state of the lower and upper jaws 61 and 62 (see FIG. 7C). The gripper 40 continues to clamp the ferrule halves 12 with the spring bias on the gripper 40 during the reshaping and resizing operation.

After reshaping and resizing, the groove 18 that is finally formed on each ferrule halve 12 would be precisely shaped, sized and located with respect to the external surface (i.e., the contact surface to the external alignment sleeve) of the ferrule halve. Upon completion of reshaping and resizing operation, the actuator 59 is operated to release the force Fin, thus relaxing the opening 63 to release the ferrule halves 12. The ferrules halves 12 are removed from the opening 63 using the gripper 40.

The section of the optical fiber used for reshaping and resizing is replaced with the bare end section of the optical fiber to be terminated within the assembled ferrule comprising the two ferrule halves 12. The optical fiber 20 and the ferrule halves 12 are removed from the gripper 40. The portion of the bare section of optical fiber that was used as a gauge tool for the FAT operation is cleaved. The remaining optical fiber and the ferrule halves are cleaned, to prepare for subsequent operations (e.g., alignment for welding operations in step D and E).

In step D in FIG. 1, the ferrule halves are again aligned and attached to each other with the cleaned end section of the optical fiber held in the grooves therebetween. In this regard, the ferrule halves and cleaved optical fiber are loaded into the alignment tool 30, in the manner discussed above. The gripper 40 is applied to secure the aligned state of the ferrule halves, and moved to the welding station in step E. The opposing flat surfaces 13 of the ferrule halves 12 are joined together, e.g., by laser welding. The end of the optical fiber 20 is thus terminated by the ferrule 10, with the tip/end face of the optical fiber 20 protruding slightly beyond the end face of the ferrule 10. The end face/tip of the optical fiber is polished (e.g., mechanically or using a laser in step H in FIG. 1) (the end face of the ferrule may be polished as well). The ferrule 10 may be assembled with other components (e.g., ferrule housing, preload spring, boot, etc. in step G in FIG. 1) to form an optical fiber connector termination of the optical fiber cable.

Post welding, the gripper is no longer necessary to maintain alignment of the ferrule halves 12, which have been assembled into a ferrule 10, but it serves as a convenient tool for handling the ferrule for subsequent operations, such as cleaving, polishing, assembly of connector components, inspection and/or packaging in steps F to J in FIG. 1.

To complement the inventive FAT operation in the overall inventive termination process in FIG. 1, some of the other steps (e.g., providing an alignment tool 30 for pre-alignment, gripper 40 to maintain alignment, etc.) are adapted to the specific ferrule configuration and the FAT operation. Some of these steps may also incorporate conventional operations, e.g., welding, polishing, etc., in the overall inventive termination process discussed above. Some of these steps may also incorporate inventive concepts beyond the scope of the present invention, which are subject of separate patent application(s).

While the above disclosed embodiment of the FAT operation makes use of a bare section of the optical fiber as a gauge for reshaping and resizing the grooves of the ferrule halves, a hard metal or glass pin 23 (FIG. 4B) could be used as the gauge instead, without departing from the scope and spirit of the present invention. In this regard, instead of loading the optical fiber in step B in FIG. 1, the gauge pin 23 is loaded with the ferrule halves 12 in the alignment tool 30 in step B, prior to the FAT operation. Post FAT operation, the gauge pin 23 is removed, and replaced with a prepared bare section of optical fiber 20 to be terminated.

The ferrule 10 has an external surface for alignment with a complementary surface of an external alignment sleeve (i.e., the inside surface of a generally cylindrical or tubular sleeve). The external surface of the ferrule is generally cylindrical, having a contact surface profile with a cross-section that is generally circular (or oval). Two similarly terminated optical fibers can be optically coupled end-to-end by the alignment sleeve. In use, two similar ferrules are inserted into the alignment sleeve, with the opposing end faces of the optical fibers in the ferrules abutting against each other. In one embodiment, one of the ferrules may be a demountable terminal ferrule attached to an optical device (e.g., a housing of a hermetically sealed optoelectronic module OM).

The ferrule in accordance with the present invention further improves the prior art, resulting in an optical fiber expanded beam connector with low insertion and return losses, which provides ease of use and high reliability, and which can be fabricated at low cost.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

The invention claimed is:

1. A process process of terminating an optical fiber with a ferrule, comprising:
providing a bare section of optical fiber or a gauge pin;
providing a pair of ferrules halves of an optical fiber ferrule, each having a pre-formed groove for receiving the bare section of optical fiber or the gauge pin;
reshaping and resizing the pre-formed groove on each ferrule halve using the bare section of optical fiber or the gauge pin as a tool, wherein the pre-formed groove of each ferrule halve is subject to a separate, subsequent reshaping and resizing step using the bare section of optical fiber or the gauge pin as the tool to form a resultant groove for receiving the optical fiber.

2. The process of claim 1, wherein the ferrule halves are aligned, and using the pre-formed grooves as guides for the gauge optical fiber or the gauge pin, the ferrule halves are compressed together with the gauge optical fiber or the gauge pin therebetween, thereby reshaping and resizing the respective pre-formed grooves on the ferrule halves to form the resultant groove.

3. The process of claim 2, wherein after reshaping and resizing, the resultant groove that is finally formed on each ferrule halve would be precisely shaped, sized and located with respect to an external alignment surface of each ferrule halve.

4. An optical fiber terminated with a ferrule, according to claim 2.

5. The process of claim 3, wherein the optical fiber is further terminated with the ferrule halves.

6. An optical fiber terminated with a ferrule, according to claim 3.

7. The process of claim 1, wherein after reshaping and resizing, the resultant groove that is finally formed on each ferrule halve would be precisely shaped, sized and located with respect to an external alignment surface of each ferrule halve.

8. The process of claim 7, wherein the optical fiber is further terminated with the ferrule halves.

9. The process of claim 1, wherein the optical fiber is further terminated with the ferrule halves.

10. An optical fiber terminated with a ferrule, according to claim 1.

* * * * *